(12) United States Patent
Bade et al.

(10) Patent No.: US 11,551,460 B2
(45) Date of Patent: Jan. 10, 2023

(54) METHOD FOR OPERATING AN ASSISTANCE SYSTEM FOR A VEHICLE AND ASSISTANCE SYSTEM

(71) Applicant: Bayerische Motoren Werke Aktiengesellschaft, Munich (DE)

(72) Inventors: Florian Bade, Munich (DE); Moritz Blume, Munich (DE); Martin Buchner, Munich (DE); Julia Niemann, Berlin (DE); Michael Wolfram, Poing (DE); Joris Wolters, Amersfoort (NL)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 490 days.

(21) Appl. No.: 16/672,628

(22) Filed: Nov. 4, 2019

(65) Prior Publication Data
US 2020/0065597 A1 Feb. 27, 2020

Related U.S. Application Data

(63) Continuation of application No. PCT/EP2018/062667, filed on May 16, 2018.

(30) Foreign Application Priority Data

Aug. 21, 2017 (DE) ..................... 10 2017 214 505.6

(51) Int. Cl.
*G06V 20/59* (2022.01)
*B60W 30/095* (2012.01)
*B60W 40/08* (2012.01)

(52) U.S. Cl.
CPC ....... *G06V 20/597* (2022.01); *B60W 30/0956* (2013.01); *B60W 40/08* (2013.01); *B60W 2040/0863* (2013.01); *B60W 2420/42* (2013.01)

(58) Field of Classification Search
CPC . G06V 20/597; G06V 20/58; B60W 30/0956; B60W 40/08; B60W 2040/0863;
(Continued)

(56) References Cited

U.S. PATENT DOCUMENTS

2002/0011925 A1* 1/2002 Hahn ..................... B60K 35/00
340/425.5
2002/0140562 A1* 10/2002 Gutta ..................... G08G 1/166
348/148
(Continued)

FOREIGN PATENT DOCUMENTS

DE 10 2009 002 979 A1 11/2010
DE 10 2013 217 405 A1 3/2014
(Continued)

OTHER PUBLICATIONS

International Search Report (PCT/ISA/210) issued in PCT Application No. PCT/EP2018/062667 dated Sep. 3, 2018 with English translation (six (6) pages).
(Continued)

*Primary Examiner* — Scott A Reinbold
(74) *Attorney, Agent, or Firm* — Crowell & Moring LLP

(57) ABSTRACT

A method for operating an assistance system for a vehicle, including an object sensor device for determining an object characteristic value representative of coordinates of an object in the environment of the vehicle and a viewing sensor device for determining a direction characteristic value representative of a viewing direction of a driver of the vehicle and for determining a position characteristic value representative of a head position of the driver. According to the method, a projection characteristic value representative of a vector that connects the head position to the object is determined; a first region characteristic value representative of an estimated primary field of view of the driver is determined; an attention characteristic value representative
(Continued)

of the probability that the object is at least partially in the field of view of the driver is determined; and a warning function of the vehicle is activated.

20 Claims, 2 Drawing Sheets

(58) Field of Classification Search
CPC ......... B60W 2420/42; B60W 2540/00; B60W 2540/225; B60W 30/08; B60W 2050/143; B60W 2050/146; B60W 2554/00; B60W 50/14; G08G 1/166
USPC .......................................... 382/103
See application file for complete search history.

(56) References Cited

U.S. PATENT DOCUMENTS

| | | | |
|---|---|---|---|
| 2004/0239509 A1* | 12/2004 | Kisacanin | G08B 21/06 340/575 |
| 2014/0070934 A1 | 3/2014 | Chau et al. | |
| 2016/0016515 A1 | 1/2016 | Mangin | |
| 2016/0297449 A1 | 10/2016 | Heim et al. | |
| 2018/0086346 A1* | 3/2018 | Fujisawa | B60W 40/08 |
| 2020/0057487 A1* | 2/2020 | Sicconi | G06F 3/011 |

FOREIGN PATENT DOCUMENTS

| | | |
|---|---|---|
| DE | 10 2012 022 691 A1 | 5/2014 |
| DE | 10 2014 214 088 A1 | 1/2016 |
| DE | 10 2015 206 200 A1 | 10/2016 |
| EP | 1 484 014 A1 | 12/2004 |
| JP | 2009-237776 A | 10/2009 |
| JP | 2014-120110 A | 6/2014 |
| JP | 2014-120111 A | 6/2014 |
| JP | 2014-120112 A | 6/2014 |
| JP | 2015-125686 A | 7/2015 |

OTHER PUBLICATIONS

German-language Written Opinion (PCT/ISA/237) issued in PCT Application No. PCT/EP2018/062667 dated Sep. 3, 2018 (seven (7) pages).

German-language Search Report issued in counterpart German Application No. 10 2017 214 505.6 dated Mar. 5, 2018 with partial English translation (17 pages).

\* cited by examiner

METHOD FOR OPERATING AN ASSISTANCE SYSTEM FOR A VEHICLE AND ASSISTANCE SYSTEM

CROSS REFERENCE TO RELATED APPLICATIONS

This application is a continuation of PCT International Application No. PCT/EP2018/062667, filed May 16, 2018, which claims priority under 35 U.S.C. § 119 from German Patent Application No. 10 2017 214 505.6, filed Aug. 21, 2017, the entire disclosures of which are herein expressly incorporated by reference.

BACKGROUND AND SUMMARY OF THE INVENTION

The invention relates to a method for operating an assistance system for a vehicle and to a corresponding assistance system, computer program and computer program product.

Vehicles today may comprise sensor units such as a camera sensor that captures a head pose, viewing direction and/or viewing position of a user based, for example, on facial features. On that basis the driver's level of fatigue, for example, can be ascertained.

An object on which the invention is based is to create a method for operating an assistance system for a vehicle and a corresponding assistance system that helps to precisely ascertain the attention of the driver.

The object is achieved by the independent claims. Advantageous configurations are characterized in the dependent claims.

According to a first aspect, the invention relates to a method for operating an assistance system for a vehicle. The assistance system comprises an object sensor device for ascertaining an object characteristic value that is representative of coordinates of an object in the vicinity of the vehicle, and a gaze sensor device for ascertaining a direction characteristic value that is representative of a viewing direction of a driver of the vehicle, and for ascertaining a position characteristic value that is representative of a head position of the driver.

In the method, the object characteristic value, the direction characteristic value and the position characteristic value are ascertained; a projection characteristic value is ascertained in dependence on the position characteristic value and the object characteristic value, the projection characteristic value being representative of a vector that connects the head position to the object; a first region characteristic value is ascertained in dependence on the direction characteristic value and position characteristic value, the region characteristic value being representative of an estimated primary field of view of the driver; next, an attention characteristic value is ascertained in dependence on the first region characteristic value and the projection characteristic value, the attention characteristic value being representative of a probability that the object is situated at least partially within the field of view of the driver, in particular in the estimated primary field of view of the driver; finally, a warning function of the vehicle is activated in dependence on the attention characteristic value.

Advantageously, this allows the warning function of the vehicle and corresponding warning time points to be adapted to the driver. In particular, the attention characteristic value can be used to indicate how well the driver can perceive individual objects in the vicinity, so it can be ensured that no unnecessary warnings are output or other warnings are output only too late.

The gaze sensor device can in particular be a camera. The direction characteristic value can describe or comprise a viewing direction vector. Alternatively or in addition, the direction characteristic value can describe a head pose of the driver. The head pose can comprise a rotation and/or inclination of the head. For example, the head pose can be described by way of a nose vector.

The object sensor device can likewise be a camera. Alternatively or in addition, the object sensor device can comprise a radar and/or lidar sensor unit or a similar sensor system. The object characteristic value can describe or comprise coordinates of a center of the object. Alternatively or in addition, the object characteristic value can also comprise coordinates of a contour of the object facing the vehicle or of the entire surface thereof that faces the vehicle. The object can be, for example, another vehicle, an obstacle, a road barrier or traffic signs. In particular, the object is an object that stands out from the street course and requires the attention of the driver. In this context, in particular other vehicles or road users should be mentioned, for example, cross traffic. The vicinity of the vehicle here and below describes the three-dimensional space external to the vehicle, in particular a partial region within the range of vision and/or viewing direction of the driver.

The estimated primary field of view of the driver corresponds, for example, to the base area of a circular cone or an elliptical cone around the nose vector. The opening angle of the cone can be, for example, between 0° and 90°, in particular between 0° and 2° for a region of the sharpest vision, between 5° and 10° for deciphering characters, between 5° and 30° for perceiving outlines, or between 30° and 60° for perceiving colors. The opening angle in the horizontal (yaw angle) with respect to the vehicle can differ from the opening angle in the vertical (pitch) with respect to the vehicle. For example, the opening angle in the horizontal is up to 90°, in the vertical on the other hand, for example, only up to 70°. The estimated primary field of view can also be referred to as the useful field of view. In particular, the estimated primary field of view can describe a region that the driver views over 90% of the driving time. The estimated primary field of view in other words describes a region in which the driver probably perceives objects.

Possible warning functions of the vehicle can be acoustic, haptic or visual notifications. By way of example, a visual notification can be projected into the field of view of the driver in a targeted fashion, such that the object is visibly highlighted.

In an advantageous configuration in accordance with the first aspect, an angle characteristic value that is representative of a smallest angle between the viewing direction and the vector that connects the head position to the object is ascertained in dependence on the direction characteristic value and the projection characteristic value. The attention characteristic value is ascertained in dependence on the angle characteristic value.

The smallest angle in this context is understood to mean the angle between the viewing direction and the vector that connects the head position and those coordinates of the object that are closest to the region of the estimated primary field of view. In other words, the coordinates can thus describe a point of the contour of the object that is closest to the point of incidence of the viewing direction or nose vector in the plane of the object.

In a further advantageous configuration according to the first aspect, the direction characteristic value is representative of a head pose of the driver. In particular, the direction characteristic value thus describes the nose vector, but not the actual viewing direction vector. In an advantageous manner, it is thus possible to dispense with a high-resolution camera as viewing sensor device. This contributes to a cost-effective production of the assistance system.

In a further advantageous configuration according to the first aspect, the first region characteristic value is representative of a region around the viewing direction with a maximum horizontal deviation of 5° to 10° inclusive.

The viewing direction characteristic value is in this context in particular the nose vector. The first region characteristic value in particular describes the previously mentioned base area of the circular or elliptical cone with the deviation as (horizontal) opening angle.

In a further advantageous configuration according to the first aspect, a second region characteristic value that is representative of an estimated peripheral field of view of the driver is ascertained in dependence on the direction and position characteristic value. The attention characteristic value is ascertained in dependence on the second region characteristic value.

Advantageously, this makes a gradation in the estimation of how well the driver can perceive individual objects in the vicinity possible. In particular, this makes an improved adaptation of the warning function of the vehicle and corresponding warning time points to the driver possible. The (horizontal) opening angle of the cone around the nose vector for peripheral perception of the object can in this case be for example between 60° and 90°. The attention characteristic value can in this context in particular indicate a probability with which the object is located in the estimated primary field of view of the driver and a probability with which the object is located in the estimated peripheral field of view of the driver.

In a further advantageous configuration according to the first aspect, the second region characteristic value is representative of a region around the viewing direction with a maximum horizontal deviation of 90°, inclusive and a maximum vertical deviation of 70°, inclusive.

In a further advantageous configuration according to the first aspect, a third region characteristic value that is representative of a field of view that is not perceivable by the driver is ascertained in dependence on the direction and position characteristic value. The attention characteristic value is ascertained in dependence on the third region characteristic value.

Advantageously, this permits further gradation of the estimation of how well the driver can perceive individual objects in the vicinity of the vehicle. In particular, this makes improved adaptation of the warning function of the vehicle and corresponding warning time points to the driver possible. The third region characteristic value is here, for example, representative of a region around the nose vector with a horizontal deviation of over 90° and/or a vertical deviation of over 70°. The attention characteristic value can in this context indicate in particular a probability with which the object is located in the estimated primary field of view of the driver, a probability with which the object is located in the estimated peripheral field of view of the driver, and a probability with which the object is located outside the field of view of the driver.

In a further advantageous configuration of the first aspect, a first state is assigned to the attention characteristic value in the case that the angle characteristic value is representative of an angle outside the second region;

a second state is assigned to the attention characteristic value in the case that the angle characteristic value is representative of an angle within the second region and outside the first region; and a third state is assigned to the attention characteristic value in the case that the angle characteristic value is representative of an angle within the first region.

A warning function of the vehicle is activated in dependence on the state that is assigned to the attention characteristic value.

If the third state is assigned to the attention characteristic value, it is possible, for example, to dispense with the warning function. In this case it must be assumed that the driver has perceived the object. If the first state is assigned to the attention characteristic value, on the other hand, it must be assumed that the driver has not perceived the object. In this case, acoustic and/or haptic and/or visual notifications, for example, are output. If the second state is assigned to the attention characteristic value, it is assumed that the object has at least peripherally been perceived by the driver. A warning can be correspondingly weakened or suppressed. Advantageously, it is thus possible to avoid the driver being flooded with stimuli; in situations of danger or similar, it is thus possible to contribute to the driver reacting to the warnings of the vehicle.

In a further advantageous configuration according to the first aspect, the direction characteristic value is representative of a viewing direction vector of the driver. In particular, the direction characteristic value comprises the actual viewing direction vector. Moreover, the projection characteristic value is representative of a vector field that connects the head position to a contour of the object. Depending on the projection characteristic value and the direction characteristic value, a fourth state of the attention characteristic value is ascertained, which is representative of a probability that the viewing direction of the driver lies within the contour of the object. Depending on the projection characteristic value and the direction characteristic value, alternatively or in addition a fifth state of the attention characteristic value is ascertained, which is representative of a probability that the object is located at least partially within the peripheral field of view of the driver.

Advantageously, it is thus possible to make a precise statement regarding the attention of the driver.

The vector field comprises in particular one or more vectors. The fourth state describes, for example, the case that the viewing direction vector is incident on the surface of the object. In the case that the viewing direction vector is ascertained instead of the nose vector, the fourth state can provide a more accurate statement than the third state. The fifth state, for example, describes the case that the viewing direction vector is not incident on the surface of the object, but the object is located in a region of the peripheral perception around the viewing direction vector. In the case that the viewing direction vector is ascertained instead of the nose vector, the fifth state can provide a more accurate statement than the second state. In particular, the second and/or third state can in this case serve as optional fallback positions.

According to a second aspect, the invention relates to an assistance system for a vehicle. The assistance system comprises an object sensor device for ascertaining an object characteristic value that is representative of coordinates of an object in the vicinity of the vehicle and a viewing sensor device for ascertaining a direction characteristic value that is representative of a viewing direction of a driver of the vehicle and for ascertaining a position characteristic value that is representative of a head position of the driver. The assistance system furthermore comprises a control unit that is set up to perform the method according to the first aspect.

According to a third aspect, the invention relates to a computer program for operating an assistance system. The computer program is configured to perform a method according to the first aspect upon execution thereof on a data processing apparatus.

According to a fourth aspect, the invention relates to a non-transitory computer-readable medium comprising executable program code. The program code, upon execution by a data processing apparatus, performs the method according to the first aspect.

Exemplary embodiments of the invention will be explained in more detail below with reference to the schematic drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of identical construction or function are provided with the same reference signs across all figures.

Figure 1:
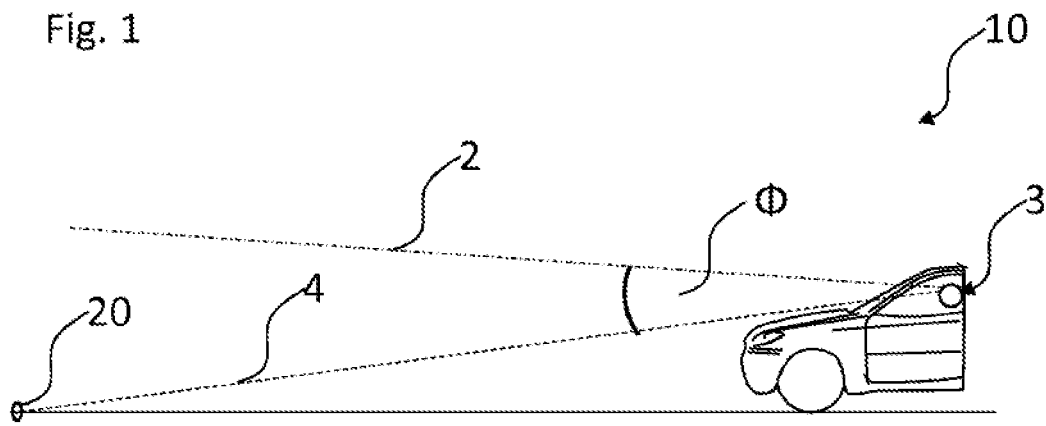
FIG. 1 shows a vehicle with the assistance system according to the invention.

FIG. 1 shows a vehicle having an assistance system 10, which is set up to detect a probable direction into which the driver gazes ("viewing direction" below) and to initiate further steps in dependence thereon. By way of example, the ascertained viewing direction can be used to monitor the attention of the driver and possibly output warnings.

The assistance system 10 comprises a viewing sensor device (not illustrated in more detail) having a camera that is arranged facing the driver and is set up to capture a viewing direction 2 of the driver as a direction characteristic value and a head position 3 of the driver as a position characteristic value, for example, on the basis of facial features such as the eye position and/or nose position. In particular, a head pose of the driver is ascertained here, that is to say a pitch and/or a yaw angle of his/her head so as to be able to determine in which regions the driver has good visibility. For example, the viewing direction corresponds to a nose vector 2a (cf. FIG. 3). The viewing sensor device can moreover comprise an optional illumination device.

The assistance system 10 furthermore comprises an object sensor device (not illustrated in more detail) having a camera, a radar or lidar sensor device that is arranged facing away from the driver and is set up to capture an object 20 and to ascertain the spatial orientation thereof with respect to the vehicle or the driver as an object characteristic value. In particular, coordinates of a contour of the object or at least of the center thereof can be provided here.

The assistance system 10 furthermore comprises a control unit (not illustrated in detail) having a data and programs memory in which a program for operating the assistance system 10 is stored, which will be explained in more detail below with reference to the flowchart of FIG. 2.

The program is started in step S1, in which, for example, variables are initialized. Furthermore, an object characteristic value is ascertained by the object sensor device and a direction and position characteristic value is ascertained by the viewing sensor device. The program is subsequently continued in step S3.

In step S3, in dependence on the position characteristic value and the object characteristic value, a projection characteristic value is ascertained that is representative of a vector 4 that connects the head position 3 to the object 20 (cf. FIG. 1). The program is subsequently continued in step S5a.

Figure 3:
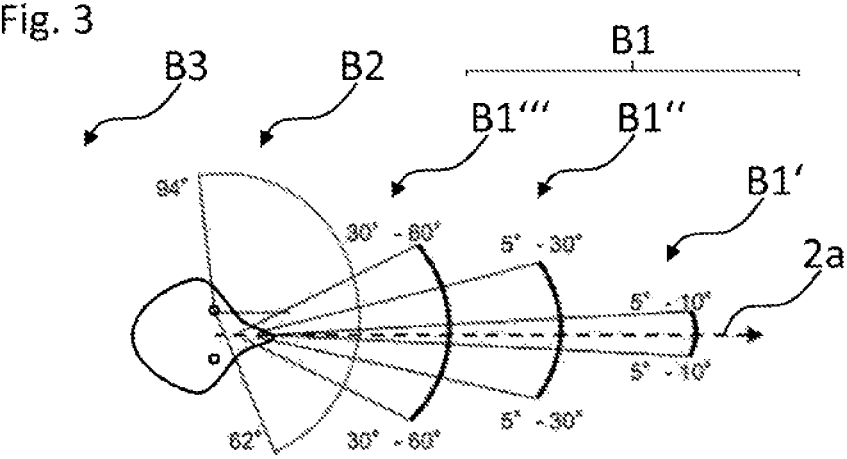
FIG. 3 shows an exemplary field of view of the driver in a perspective view.
Figure 4:
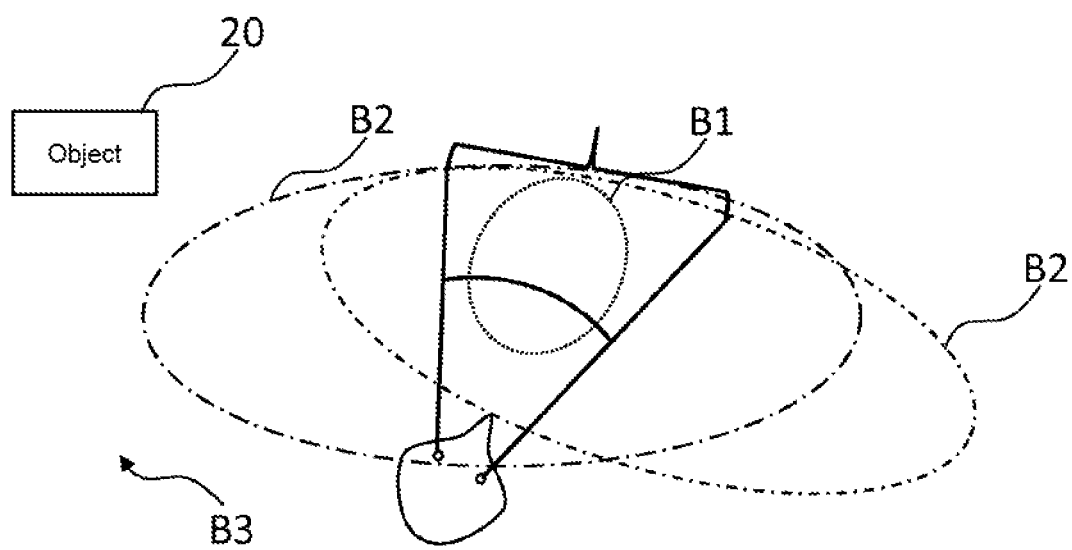
FIG. 4 shows an exemplary flowchart of a method for operating the assistance system according to FIG. 1.

In step S5a, depending on the direction and position characteristic value, a first region characteristic value is ascertained that is representative of an estimated primary field of view B1 of the driver (cf. FIGS. 3-4). The primary field of view B1 is in the present case a region around the nose vector 2a with a maximum horizontal deviation of approximately 60°. The region can also be considered to be a base area of a circular or elliptical cone. Depending on the requirements in terms of accuracy, the primary field of view B1 can comprise here a plurality of partial regions. For example, the primary field of view B1 can be divided into a region B1' with a maximum horizontal deviation of 5° to 10°, in which the driver can (just about still) decipher characters; a region B1" with a maximum horizontal deviation of 5° to 30°, in which the driver can (just about still) perceive outlines; and a region B1''' with a maximum horizontal deviation of 30° to 60°, in which the driver can (just about still) perceive colors.

In the present embodiment variant, the primary field of view B1 designates a region with a maximum horizontal deviation of 7°, inclusive and a maximum vertical deviation of 9°, inclusive. This region can also be referred to as the useful field of view.

In this embodiment variant, the program is subsequently continued in step S5b. In other embodiment variants, however, the program can also be continued in step S5c or S7.

In step S5b, a second region characteristic value that is representative of an estimated peripheral field of view B2 of the driver is ascertained in dependence on the direction and position characteristic value. The peripheral field of view B2 in the present case is a region around the nose vector 2a with a maximum horizontal deviation of up to 94°. As is illustrated in FIG. 3, the horizontal deviation can here be asymmetrical around the nose vector 2a. The limited field of vision of one eye to the nose is, however, compensated by the respective other eye.

The used upper limit of the primary field of view B1, that is to say for example at most 60°, can be used as the lower limit of the horizontal deviation. In the present exemplary embodiment, the lower limit is 7°. A maximum vertical deviation furthermore is 70°, inclusive. A lower limit of the deviation of the peripheral field of view B2 can be given analogously to the above description and is for example 9°.

In this embodiment variant, the program is subsequently continued in step S5c. However, in other embodiment variants the program can also be continued in step S7.

In step S5c, a third region characteristic value that is representative of a field of view B3 that is not perceivable by the driver is ascertained in dependence on the direction and position characteristic value. The field of view B3 that is not perceivable is in particular a region outside the peripheral field of view B2. The horizontal deviation in this context is in particular more than 90°, for example, more than 94°. Alternatively or in addition, the vertical deviation is, for example, more than 70°. As is illustrated in FIG. 4, the object 20 is therefore not perceivable outside the primary and peripheral field of view B1, B2 or by the driver. The program is subsequently continued in step S7.

In step S7, an angle characteristic value that is representative of a smallest angle $\phi$ between the viewing direction 2 and the vector 4 that connects the head position 3 to the object 20 is ascertained in dependence on the direction characteristic value and the projection characteristic value (see FIG. 1). The program is subsequently continued in step S9.

In step S9, an attention characteristic value that is representative of a probability that the object 20 is located at least partially in the field of view of the driver is ascertained in dependence on the angle characteristic value and the corresponding region characteristic value. In this context, in particular a check is performed in step S9 as to whether the angle $\phi$ is located outside the peripheral field of view B3. In this case, the attention characteristic value is assigned a first state;

the angle $\phi$ is located within the peripheral field of view B2 and outside the primary field of view B1. In this case, the attention characteristic value is assigned a second state; or whether the angle $\phi$ is located within the primary field of view B1. In this case, the attention characteristic value is assigned a third state.

By way of example, only the ascertained angle $\phi$ and the above-stated limit angles are compared in this respect. The program is subsequently continued in step S11.

In step S11, a warning function of the vehicle is activated in dependence on the attention characteristic value. For example, a warning is output only when the attention characteristic value is assigned the first state. The program is subsequently ended.

In a second exemplary embodiment, which is not illustrated, the viewing sensor device is set up to ascertain, in addition to the head pose, an actual viewing direction vector as the viewing direction 2, for example, on the basis of a pupil position of the driver. The program steps S1 and S3 are performed analogously to the flowchart of FIG. 2. The projection characteristic value in this case, however, is representative of a vector field that connects the head position 3 to a contour of the object 20. The program is continued after step S3 in step S4.

In step S4, in dependence on the projection characteristic value and the direction characteristic value, a fourth state of the attention characteristic value is ascertained that is representative of a probability that the viewing direction of the driver is located within the contour of the object. In particular, step S4 thus ascertains whether the viewing direction vector is incident on a surface of the object 20 that faces the vehicle. To this end, for example, the corresponding angles between the individual vectors 4 of the vector field and of the viewing direction vector can likewise be ascertained and compared. If the attention characteristic value is assigned the fourth state, it can be assumed with a high degree of reliability that the driver has perceived the object. In that case, a warning can be dispensed with. The program can then be ended.

Alternatively, in the case that the viewing direction vector is not incident on the surface of the object 20 facing the vehicle, a check is performed as to whether the object 20 is located in the peripheral field of view B2 of the driver. Analogously to the steps S5a to S9, a check is performed in this connection in particular as to whether the angle $\phi$ between the actual viewing direction vector 2 and the vector 4 lies within the peripheral field of view B2 and outside the primary field of view B1. If this is the case, it can be assumed with a high degree of reliability that the driver has peripherally perceived the object. In this context, the attention characteristic value is assigned a fifth state. A warning can in this case, for example, likewise be dispensed with. The program can subsequently be ended.

Figure 2:
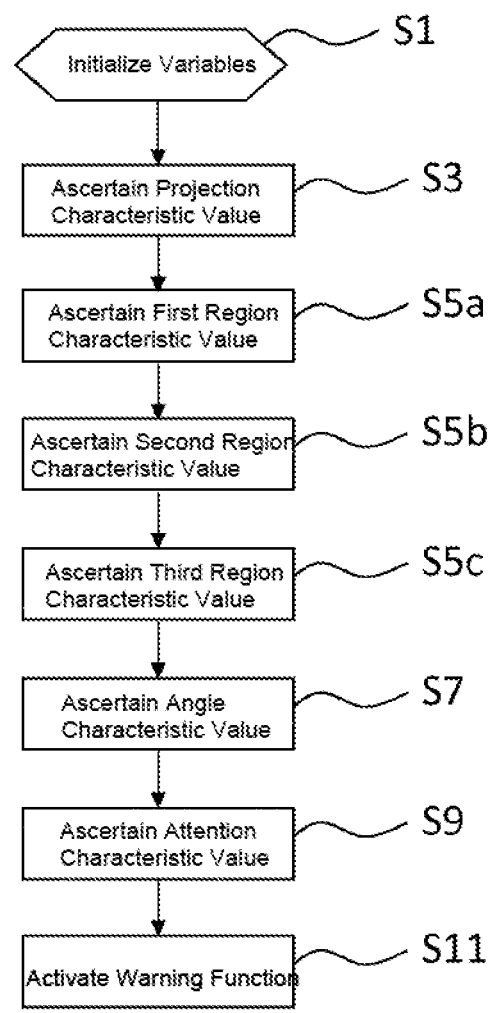
FIG. 2 shows an exemplary field of view of a driver in plan view.

In the case that the viewing sensor device degrades during operation, for example, a reliable statement relating to the viewing direction vector can thus no longer be made, but the head pose can still be ascertained, the program can be continued in the corresponding program step of the flowchart of FIG. 2 in order to ascertain the attention characteristic value only on the basis of the first, second and third state.

Advantageously, the vehicle is supplied by the described methods with information as to which objects in the vicinity of the vehicle are perceivable by the driver or are probably perceived by the driver. The listed states (first to fifth state) can thus serve, for example, as a basis for outputting a warning function and/or be made available as an output signal to further assistance systems of the vehicle. This makes in particular adaptation of the reproduction of information and entertainment offers to the vicinity of the driver possible.

In summary, this is made possible by ascertaining how well the driver can perceive individual objects in the vicinity. This is done by ascertaining the head pose and head position of the driver using a camera that is directed at the driver. To ensure the cost-effectiveness of the product, ascertainment of the viewing angle of the driver is dispensed with, for example, which would require a camera with a higher resolution. The head pose and head position of the driver are used to calculate the smallest angle with respect to the object measured by the vehicle. The smallest angle with respect to the object is used to determine whether the object lies in any one of the three following regions:

probably seen by the driver: when the angle with respect to the object is small enough that the object intersects with the useful field of view, that is to say the region in which the eyes of the driver are located for 90% of the driving time.

probably seen by the driver in the peripheral region: when the object is not located in the first region, but still in a region in which it can be peripherally perceived by the driver.

not seen: when the angle with respect to the object is large enough that it cannot be perceived by the driver.

The assistance system can advantageously be scalable for adaptations to sensor properties. When the viewing sensor device is configured to ascertain a driver viewing angle, the viewing angle is used for evaluation instead of the head pose. Hereby, the above-listed three basic states are expandable by the following states:

seen: the view of the driver intersects the object surface.

peripherally seen: the view of the driver does not intersect the object surface, but the object is reliably located in the peripheral region.

In the case that the viewing sensor device degrades during operation in a state in which only the head pose can be ascertained, the above-mentioned three basic states can serve as fallback position for evaluation.

LIST OF REFERENCE SIGNS 10 assistance system
20 object 2 viewing direction
2a nose vector
3 head position
4 vector
Φ angle
B1 . . . B3 field of view
S1 . . . S11 program steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an assistance system for a vehicle, including an object sensor device and a viewing sensor device, the method comprising:
    determining, by the object sensor device, an object characteristic value that is representative of coordinates of an object in a vicinity of the vehicle;
    determining, by the viewing sensor device, a direction characteristic value that is representative of a viewing direction of a driver of the vehicle and a position characteristic value that is representative of a head position of the driver;
    determining, depending on the position characteristic value and the object characteristic value, a projection characteristic value that is representative of a vector that connects the head position to the object;
    determining, depending on the direction characteristic value and the position characteristic value, a first region characteristic value that is representative of an estimated primary field of view of the driver;
    determining, depending on the first region characteristic value and the projection characteristic value, an attention characteristic value that is representative of a probability that the object is located at least partially in the field of view of the driver; and
    activating a warning function of the vehicle depending on the attention characteristic value.

2. The method according to claim 1, further comprising:
    determining, depending on the direction characteristic value and the projection characteristic value, an angle characteristic value that is representative of a smallest angle between the viewing direction and the vector that connects the head position to the object; and
    determining, the attention characteristic value depending on the angle characteristic value.

3. The method according to claim 1, in which the direction characteristic value is representative of a head pose of the driver.

4. The method according to claim 1, wherein the first region characteristic value is representative of a region around the viewing direction with a maximum horizontal deviation of 5° to 10°, inclusive.

5. The method according to claim 1, further comprising:
    determining, depending on the direction characteristic value and the position characteristic value, a second region characteristic value that is representative of an estimated peripheral field of view of the driver; and
    determining the attention characteristic value depending on the second region characteristic value.

6. The method according to claim 5, wherein the second region characteristic value is representative of a region around the viewing direction with a maximum horizontal deviation of 90°, inclusive, and a maximum vertical deviation of 70°, inclusive.

7. The method according to claim 1, further comprising:
    determining, depending on the direction characteristic value and the position characteristic value, a third region characteristic value that is representative of an area outside of a field of view of the driver; and
    determining the attention characteristic value depending on the third region characteristic value.

8. The method according to claim 1, further comprising:
    assigning a first state to the attention characteristic value when the angle characteristic value is representative of an angle outside the second region;
    assigning a second state to the attention characteristic value when the angle characteristic value is representative of an angle within the second region and outside the first region; and
    assigning a third state to the attention characteristic value when the angle characteristic value is representative of an angle within the first region;
    wherein a warning function of the vehicle is activated depending on an a state that is assigned to the attention characteristic value.

9. The method according to claim 1, wherein
    the direction characteristic value is representative of a viewing direction vector of the driver; and
    the projection characteristic value is representative of a vector field that connects the head position to a contour of the object;
    the method further comprising:
    determining, depending on the projection characteristic value and the direction characteristic value, a fourth state of the attention characteristic value that is representative of a probability that the viewing direction of the driver is located within the contour of the object; and
    determining, depending on the projection characteristic value and the direction characteristic value, a fifth state of the attention characteristic value that is representative of a probability that the object is located at least partially within the peripheral field of view of the driver.

10. The method according to claim 2, in which the direction characteristic value is representative of a head pose of the driver.

11. The method according to claim 2, wherein the first region characteristic value is representative of a region around the viewing direction with a maximum horizontal deviation of 5° to 10°, inclusive.

12. The method according to claim 3, wherein the first region characteristic value is representative of a region around the viewing direction with a maximum horizontal deviation of 5° to 10°, inclusive.

13. The method according to claim 2, further comprising:
    determining, depending on the direction characteristic value and the position characteristic value, a second region characteristic value that is representative of an estimated peripheral field of view of the driver; and
    determining the attention characteristic value depending on the second region characteristic value.

14. The method according to claim 3, further comprising:
    determining, depending on the direction characteristic value and the position characteristic value, a second region characteristic value that is representative of an estimated peripheral field of view of the driver; and determining the attention characteristic value depending on the second region characteristic value.

15. The method according to claim 2, further comprising:
determining, depending on the direction characteristic value and the position characteristic value, a third region characteristic value that is representative of an area outside of a field of view of the driver; and
determining the attention characteristic value depending on the third region characteristic value.

16. The method according to claim 3, further comprising:
determining, depending on the direction characteristic value and the position characteristic value, a third region characteristic value that is representative of an area outside of a field of view of the driver; and
determining the attention characteristic value depending on the third region characteristic value.

17. The method according to claim 2, further comprising:
assigning a first state to the attention characteristic value when the angle characteristic value is representative of an angle outside the second region;
assigning a second state to the attention characteristic value when the angle characteristic value is representative of an angle within the second region and outside the first region; and
assigning a third state to the attention characteristic value when the angle characteristic value is representative of an angle within the first region;
wherein a warning function of the vehicle is activated depending on an a state that is assigned to the attention characteristic value.

18. The method according to claim 2, wherein
the direction characteristic value is representative of a viewing direction vector of the driver; and
the projection characteristic value is representative of a vector field that connects the head position to a contour of the object;
the method further comprising:
determining, depending on the projection characteristic value and the direction characteristic value, a fourth state of the attention characteristic value that is representative of a probability that the viewing direction of the driver is located within the contour of the object; and
determining, depending on the projection characteristic value and the direction characteristic value, a fifth state of the attention characteristic value that is representative of a probability that the object is located at least partially within the peripheral field of view of the driver.

19. An assistance system for a vehicle, comprising:
an object sensor device configured to determine an object characteristic value that is representative of coordinates of an object in a vicinity of the vehicle;
a viewing sensor device configured to determine a direction characteristic value that is representative of a viewing direction of a driver of the vehicle and for ascertaining a position characteristic value that is representative of a head position of the driver, and
a control device programmed to
determine, by the object sensor device, an object characteristic value that is representative of coordinates of an object in a vicinity of the vehicle;
determine, by the viewing sensor device, a direction characteristic value that is representative of a viewing direction of a driver of the vehicle and a position characteristic value that is representative of a head position of the driver;
determine, depending on the position characteristic value and the object characteristic value, a projection characteristic value that is representative of a vector that connects the head position to the object;
determine, depending on the direction characteristic value and the position characteristic value, a first region characteristic value that is representative of an estimated primary field of view of the driver;
determine, depending on the first region characteristic value and the projection characteristic value, an attention characteristic value that is representative of a probability that the object is located at least partially in the field of view of the driver; and
activate a warning function of the vehicle depending on the attention characteristic value.

20. A non-transitory computer-readable medium, including an executable program code, wherein the program code upon execution by a data processing apparatus performs a method comprising:
determining, by the object sensor device, an object characteristic value that is representative of coordinates of an object in a vicinity of the vehicle;
determining, by the viewing sensor device, a direction characteristic value that is representative of a viewing direction of a driver of the vehicle and a position characteristic value that is representative of a head position of the driver;
determining, depending on the position characteristic value and the object characteristic value, a projection characteristic value that is representative of a vector that connects the head position to the object;
determining, depending on the direction characteristic value and the position characteristic value, a first region characteristic value that is representative of an estimated primary field of view of the driver;
determining, depending on the first region characteristic value and the projection characteristic value, an attention characteristic value that is representative of a probability that the object is located at least partially in the field of view of the driver; and
activating a warning function of the vehicle depending on the attention characteristic value.

* * * * *